US012413014B2

(12) United States Patent
Bowman et al.

(10) Patent No.: US 12,413,014 B2
(45) **Date of Patent: *Sep. 9, 2025**

(54) ELECTRICAL CONNECTOR WITH PULL RELEASE

(71) Applicant: Hi Rel Connectors, Inc., Claremont, CA (US)

(72) Inventors: Torin Lee Bowman, Claremont, CA (US); Ramon A. Figueroa, Claremont, CA (US)

(73) Assignee: HI REL CONNECTORS, INC., Claremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,724

(22) Filed: Oct. 6, 2023

(65) Prior Publication Data

US 2024/0039210 A1 Feb. 1, 2024

Related U.S. Application Data

(63) Continuation of application No. 17/151,638, filed on Jan. 18, 2021, now Pat. No. 11,784,436, which is a continuation-in-part of application No. 16/518,860, filed on Jul. 22, 2019, now Pat. No. 10,897,104, which is a continuation of application No. 15/696,181, filed on Sep. 6, 2017, now Pat. No. 10,396,493.

(51) Int. Cl.

| | |
|---|---|
| ***H01R 13/623*** | (2006.01) |
| ***H01R 13/622*** | (2006.01) |
| ***H01R 13/631*** | (2006.01) |
| ***H01R 13/633*** | (2006.01) |
| ***H01R 43/26*** | (2006.01) |

(52) U.S. Cl.

CPC ......... *H01R 13/623* (2013.01); *H01R 13/622* (2013.01); *H01R 13/631* (2013.01); *H01R 13/6335* (2013.01); *H01R 43/26* (2013.01)

(58) Field of Classification Search

CPC .. H01R 13/623; H01R 13/622; H01R 13/631; H01R 13/6335; H01R 43/26

USPC ................................ 439/155, 180, 254–257

See application file for complete search history.

(56) References Cited

U.S. PATENT DOCUMENTS

| | | | | |
|---|---|---|---|---|
| 4,279,458 A * | 7/1981 | Knapp ................ | H01R 13/622 439/258 |
| 4,390,222 A * | 6/1983 | Carter .................. | H01R 13/635 439/258 |
| 4,620,760 A * | 11/1986 | Duncan ................ | H01R 13/622 439/153 |
| 4,941,846 A * | 7/1990 | Guimond ............ | H01R 24/542 439/256 |
| 7,850,472 B2 * | 12/2010 | Friedrich ........... | H01R 13/6277 439/256 |
| 7,972,158 B2 * | 7/2011 | Wild .................. | H01R 13/6277 439/352 |

(Continued)

*Primary Examiner* — Gary F Paumen

(74) *Attorney, Agent, or Firm* — Ivan M. Posey, Esq.

(57) ABSTRACT

A connector plug comprises two or more pivotable nut members that are configured to engage one or more threads on a receptacle to secure the connector plug to the receptacle in a closed position. A lanyard or merely a pivoting mechanism is configured to cause pivoting of the nut member to disengage the one or more threads in an open position to allow disengagement of the connector plug from the receptacle.

21 Claims, 8 Drawing Sheets

(56) References Cited

U.S. PATENT DOCUMENTS

| | | | | |
|---|---|---|---|---|
| 8,187,014 | B2 * | 5/2012 | Laughlin | H01R 13/633<br>439/258 |
| 10,496,493 | B1 * | 12/2019 | Lieberman | G06F 11/1469 |
| 10,897,104 | B2 * | 1/2021 | Bowman | H01R 43/26 |

* cited by examiner

ELECTRICAL CONNECTOR WITH PULL RELEASE

CONTINUATION INFORMATION

This is a Continuation of U.S. patent application Ser. No. 17/151,638, entitled ELECTRICAL CONNECTOR WITH PULL RELEASE, filed on Jan. 18, 2021, which is a Continuation-In-Part of U.S. patent application Ser. No. 16/518,860, entitled ELECTRICAL CONNECTOR WITH PULL RELEASE, filed on Jul. 22, 2019, which is a Continuation of U.S. patent application Ser. No. 15/696,181, entitled ELECTRICAL CONNECTOR WITH PULL RELEASE, filed on Sep. 6, 2017.

FIELD OF THE INVENTION

Disclosed and described is an electrical connector pull release system. Specifically, electrical connector includes a lanyard which activates a release mechanism upon pulling.

BACKGROUND

Connectors used by U.S. Department of Defense were originally developed in the 1930s for severe aeronautical and tactical service applications, and the Type "AN" (Army-Navy) series set the standard for modern military circular connectors. These connectors, and their evolutionary derivatives, are often called Military Standard, "MIL-STD", or (informally) "MIL-SPEC" or sometimes "MS" connectors. They are now used in aerospace, industrial, marine, and even automotive commercial applications.

Connectors usually consist of (i) a mating pair (plug and receptacle) each equipped with male (pin) or female (socket) contacts; note that at least one of the connector halves, or its contacts, should be floating to minimize mechanical stresses. FIG. 1 is an illustration of a prior art MIL-DTL-38999 circular connector (receptacle 25 and plug 27).

Electrical connector contacts are typically Beryllium copper (BeCu) or Phosphor bronze which is then plated with gold or some other non-corrosive, highly-conductive metal. The contacts are contained by a dielectric insulator (typically a layered construct of various polymers or glass depending upon connector series and manufacturer, and often known as the insert) and are housed in an enclosure (i.e., shell), that is often diecast aluminium and plated or anodized for corrosion protection. Steel and titanium are also used. The contacts may be captive or removable using a special tool. The electrical connection into the system at the contact terminal is either a soldered or crimped connection. The seal between the shell and insulator may be moisture resistant or a hermetic seal. The inserts in each connector half must be oriented for correct mating, and the shell or insert usually contains a keying feature to prevent mis-mating that could damage the connector or result in an electrical problem. Cable clamps and other mounting hardware may be provided, and the mated halves are usually secured by a locking mechanism to prevent disengagements.

Fiber optic connectors are typically plugs or so-called male connectors with a protruding ferrule that holds the fibers and aligns two fibers for mating. They use a mating adapter to mate the two connectors that fits the securing mechanism of the connectors (bayonet, screw-on or snap-in.) A primary specification issue for fiber optic connectors is insertion loss, i.e., the amount of light lost in the connection expressed in dB Connectors (Electrical) described by Military Specifications MIL-DTL-5015 (formerly MIL-C-5015) describes electrical circular connectors with solder or removable crimp contacts (both front and rear release). These connectors are for use in electronic, electrical power, and control circuits and are used in large numbers for defense, civil, and industrial applications due to their versatility, reliability, and ease of supply. These connectors are rated for operation within a temperature range of ~55° C. (−67° F.) to either 125° C. (257° F.), 175° C. (347° F.), or 200° C. (392° F.) depending upon the class of the connector. The insert arrangements are provided in MIL-STD-1651.

MIL-DTL-12520 (formerly MIL-C-12520) describes the general requirements for a series of centerlock screw coupling, waterproof, polarized, multicontact connectors and accessories for inter-connection of power and control circuits on electronic equipment that are intended primarily for ground or shore use. Resistant to contamination of dust, dirt, and water, these harsh environment connectors also provide the resistance to shock and vibration via the center-locking screw, which is easily secured by turning the mechanized fold-down, wing-blade handle. The insert arrangements are provided in the specification.

MIL-DTL-22992 (formerly MIL-C-22992) describes multi-contact, heavy duty, quick disconnect, waterproof, electrical plug and receptacle connectors and associated accessories for electronic and electrical power and control circuits. The connectors are rated for −55 degrees to +125 degrees Celsius. These connectors are intended for use as follows: (i) Class C connectors are intended for external interconnection use on vans, shelters, trailers, buildings and heavy duty applications; (ii) Class J connectors are used in Class C applications where a wire support grommet is necessary; (iii) Class L connectors are intended for power connections from 40 to 200 amperes where heavy duty, waterproof and arc quenching ability are required; and (iv) Class R connectors are used as general purpose heavy-duty connectors where pressurization and arc quenching ability are not required. The insert arrangements are provided in MIL-STD-1651, with additional arrangement for high-current applications provided in the associated MS sheets.

MIL-DTL-24308 (formerly MIL-C-24308 and MIL-PRF-24308) describes non-environmental, polarized shell, miniature, rack and panel connectors having pin and socket, crimp (removable), solder (non-removable), or insulation displacement (non-removable) contacts with rigid or float mounting, designed for −55° C. to +125° C. operating temperature range. Also called D-subminiature or D-sub connectors, they are designed primarily for applications where space and weight are of major importance while accommodating a large number of circuits in proportion to their size which makes them well suited for aircraft, missiles and related ground support systems. Although MIL-C-24308 connectors are primarily designed for rack and panel applications, these connectors can also be adapted for other cabling requirements by addition of accessories and integral clamps. These connectors are intended for general military use as follows: (i) Classes G and N connectors are intended for use in applications where the operating temperature range of −55° to +125° C. is experienced; Class N connectors are used in applications where the presence of residual magnetism must be held to low levels; (iii) Class H receptacles are used where atmospheric pressures must be contained across the wall or panels on which the connectors are mounted; and (iv) Classes D, K, and M connectors are for high-reliability space applications. The insert arrangements are provided in the specification.

MIL-DTL-26482 (formerly MIL-C-26482) describes the general requirements for two series of environment resisting, quick disconnect, miniature, circular electrical connectors (and accessories). Each series includes hermetic receptacles. The two series of connectors are intermateable when using power contacts and are not intermateable when using shielded contacts. The various connector classes and types include: (i) Classes E, F, J, and P connectors are used in environment-resisting applications with an operating temperature range of −55-to-125 degree Celsius (−67-to-257 degree F.); and (ii) Class H receptacles are used applications wherein pressures must be contained across the walls or panels on which the connector is mounted. Many applications for this connector deviate from the official military specification; for an example, a robust metallic shell based on the MIL-DTL-26482 design supports the use of Ethernet data communications networks in harsh environments while maintaining compatibility with IEC 60603-7-7 requirements. MIL-DTL-26482 include two series of circular connectors: Series I includesMS3110, MS3111, MS3112, MS3114 and MS3116 connectors, while Series II includes MS3470, MS3474, MS3475 and MS3476 connectors. The insert arrangements are provided in MIL-STD-1669.

MIL-DTL-32139 describes nanominiature connectors terminated on printed circuit boards or attached to cable assemblies. These connector's contacts are densely packed with 0.64 mm (0.025 inch) spacing between contact centers in the same row. These connectors are intended for interconnections on printed wiring board (PWB), PWB-to-cable, cable-to-panel, or cable-to-cable on miniaturized equipment sub-assemblies with low power requirements. The connectors are militarily unique because of requirements to operate satisfactorily under sinusoidal vibrations of 10-to-2000 Hz at up to 20 g's, to withstand 48-hours of salt spray without exposure of base metals affecting performance or causing pitting/porosity of the finish; to withstand 100 g's of shock with no electrical discontinuity; and to operate at temperatures of −55 to +125 degrees Celsius. The insert arrangements are provided in the associated specification sheets.

MIL-DTL-38999 (formerly MIL-C-38999) describes four series of miniature, high density, bayonet, threaded, or breech coupling, circular, environment resistant, electrical connectors using removable crimp or fixed solder contacts, and are capable of operation within a temperature range of −65 to +200 degrees Celsius. The connectors are intended for use as follows: (i) Series I connectors are used where a quick disconnect coupling system is required for blind mating or other mating problem areas, and these connectors provide high-vibration characteristics and are suitable for severe wind and moisture problem (SWAMP) areas with proper connector accessories; (ii) Series II connectors are used where the connector is not subjected to high vibration or SWAMP areas and where space or weight is at a premium due to their lower profile; (iii) Series III connectors are suitable for blind mating areas, and provide high-vibration characteristics at elevated temperature and are suitable for SWAMP areas with the proper connector accessories; and (iv) Series IV connectors are used where a quick disconnect coupling system is required for blind mating or other mating problem areas, and these connectors provide high-vibration characteristics and are suitable for SWAMP areas with the proper connector accessories. These connectors are lightweight, and are all scoop proof with the exception of series II which are non-scoop-proof. The insert arrangements are provided in MIL-STD-1560.

MIL-DTL-83513, (formerly MIL-C-83513) describes polarized shell, micro-miniature, rectangular electrical connectors with solder or non-removable crimp contacts. The connector meets demanding applications and harsh environments and it is mechanically robust and durable, with low contact resistance, high current capability and high dielectric strength, and it has an excellent resistance to shock and vibration, while offering a high pin density, small size and lightweight body. Often referred to as a Micro-D connector system, the connector is suited to a multitude of systems where weight, miniaturization or signal transmission integrity are paramount, such as missiles and their guidance systems, aerospace avionics, radars, shoulder-launched weapon systems, advanced soldier technology systems, military Global Positioning Systems, satellites, medical devices and down-hole drilling tools. The insert arrangements are provided in the associated specification sheets.

MIL-DTL-83527, (formerly DoD-C-83527 and MIL-C-83527) describes the requirements, quality assurance criteria and test procedures for the design and fabrication of an environment resisting low insertion force, multiple insert rectangular connector used in the electrical/electronic bay areas of military aircraft. The connector provides the electrical interface between the avionics equipment and the equipment rack or tray. These connectors are military unique because they must operate satisfactory at high altitude 50,000 feet (15.2 km), endure 500 hours of salt spray, vibration testing (functional and endurance), shock (30 g's), and temperatures from −65 to +125° C. These connectors must be used in conjunction with DoD-STD-1842 which describes the insert arrangements for use with MIL-DTL-83527 Rack-to-Panel connectors. The insert arrangements are provided in DOD-STD-1842.

MIL-DTL-83538, (formerly MIL-C-83538) describes connectors and accessories, electrical, circular, umbilical. The connector assembly provides the necessary connections required to meet a MIL-STD-1760, Class I electrical interface between stores and their associated launchers using a "blind mating" mechanism. The connector assembly consists of a receptacle installed on the launcher, a receptacle installed on the store, and a buffer plug installed between the two receptacles. This specification also includes the required mounting adapters and nut, accessory adapter, cable bushing, and protective covers. This connector assembly provides the transfer of MIL-STD-1760 interface class I electrical signals and power between an aircraft (or ground vehicle) mounted launcher and an associated store. This connector is military unique because it is intended to be used on rail and eject launchers where engagement/disengagement of the launcher receptacle (with attached buffer plug) to the store receptacle will be via a blindmate mechanical mechanism; whereas no known commercially equivalent substitute is available. The insert arrangement is 25-20 of MIL-STD-1560.

Connectors (Fiber Optic) Described by Military Specifications

MIL-C-83522 is a military specification describing the characteristics, performance and testing criteria for single terminus fiber-optic connectors. The specification covers families of both bulkhead and cable termination configurations. The connectors must have consistent optical performance, and must be supplied under a MIL-STD-790 reliability assurance program. Statistical process control (SPC) techniques are required in the manufacturing process to minimize variation in the final product. These connectors are intended for use in fixed plant locations, tactical, aerospace and spaceflight avionics, shipboard, ground vehicle, and other specialized military applications.

MIL-DTL-83526, (formerly MIL-C-83526) is a military specification describing the characteristics, performance and testing criteria for an environmental resistant, hermaphroditic interface, fiber-optic circular connector. The connectors covered have a consistent and predictable optical performance using low loss optical fiber cables in military, ground based, fiber-optic data transmission systems, and are sufficiently rugged to withstand military field applications. This specification includes expanded-beam fiber-optic connectors.

Alternative Connectors (Electrical and Fiber Optic) for Military Applications

Selection of connector alternatives that are not defined by military specifications (MIL-C or MIL-DTL) can use either designated performance specifications (MIL-PRF) issued by the Department of Defense (DoD) or by using Commercial Item Descriptions (CID) issued by the General Services Administration (GSA) pursuant to DoD 4120.24-M, or by using standards developed by nationally and internationally recognized technical, professional, and industry associations and societies, collectively referred to as "Non-Government Standards Bodies" (NGSBs).

Performance Specifications are connector specifications that are intended to describe product that is essentially the same quality previously defined by familiar military specifications and built under the DoD's Qualified Manufacturer List (QML) product/supplier controlled system rather than the more-stringent Qualified Product Line (QPL) system.

MIL-PRF-29504 (formerly MIL-T-29504) is a performance specification describing the general requirements for removable crimp and epoxy type fiber-optic termini for use in connectors and similar components. These termini are unique for military applications and must operate satisfactorily in systems under demanding conditions of 10 g's vibration (10 g's), shock (over 1000 g's), and temperature excursions (from −40 degrees C. to +70 degrees C.).

MIL-PRF-28876 (formerly MIL-C-28876) is a performance specification describing for circular, plug and receptacle style, multiple removable termini, fiber-optic connectors that are for DoD applications and that are compatible with multiple transmission element cables. This specification describes a family of general purpose, interconnection hardware providing a variety of compatible optical coupling arrangements, and includes connector shells, connector inserts, connector insert retention nuts, connector backshells, and connector dust caps. These connectors are unique for military applications and must operate satisfactorily in systems under demanding conditions of 10 g's vibration (10 g's), shock (over 1000 g's), and temperature excursions (from −40 degrees C. to +70 degrees C.).

MIL-PRF-39012 (formerly MIL-C-39012) is a performance specification describing the general requirements and tests for Radio Frequency (RF) connectors used with flexible RF cables and certain other types of coaxial transmission lines.

MIL-PRF-31031 (formerly MIL-C-31031) is a performance specification describing the general requirements and tests for RF connectors used with flexible cables and certain other types of coaxial transmission lines.

MIL-PRF-49142 (formerly MIL-C-49142) is a performance specification describing the general requirements and tests for RF, triaxial, connectors. These connectors and fittings are intended for use with biaxial cable and can be used for RF applications when more shielding is required, and they can also be used for serial digital transfer.

MIL-PRF-64266 is a performance specification describing the performance requirements for circular, plug and receptacle style, multiple removable genderless termini, fiber optic connectors for DoD applications—including aerospace and maritime—and that are compatible with multiple transmission element cables. These fiber optic connectors cover a family of general purpose, interconnection hardware providing a variety of compatible optical coupling arrangements, including connector shells, connector inserts, connector backshells, connector backshell accessories, and connector dust caps. All connector styles are designed to assure proper orientation of the mating halves prior to mating, and provide engagement between mated shells prior to terminus engagement and have the termini so located as to be protected from handling damage. The plug and receptacle styles permit straight, wall (panel) mounted, jamnut mounted, right angle and other connector configurations.

Disconnection Techniques

One of the applications of these and other connectors may be the ability for disconnection when needed. For example, some specifications require that the connector disconnect upon application of force on the connector. This specification may be useful in military applications, such as, for example, deployment of ordinance from a fuselage or wing pod of an airplane, or disconnection upon the launch of ground-to-air ordinance, an ICBM, or an SLBM.

Some specifications require that the connector disconnect upon application of, for example, ninety pounds of force on the connector. This means that the connector must be designed to have threads that deflect off of the receptacle threads at ninety pounds of force or less, or have some other mechanism that causes the connector to disconnect, which would happen during launching. Various designs of connectors have been made to satisfy this requirement, including, for example, using a weak plastic threading for the connector that would deflect off of the receptacle during launch. While qualified parts or connectors designed to MIL spec 38999/29/30 are made to be disengaged 50 times without being replaced, the deflection-by-force method of dislodging threading can eventually cause damage over time as durability has been an issue.

Thus there is a need for a connector having a release mechanism that overcomes the above disadvantages.

BRIEF DESCRIPTION OF THE DRAWINGS

In accord with one preferred embodiment of the invention, a connector plug, comprising two or more pivotable inner coupling nut members that are configured to engage one or more threads on a receptacle to secure the connector plug to the receptacle in a closed position; and a lanyard configured to cause pivoting of the inner coupling nuts to disengage the one or more threads in an open position to allow disengagement of the connector plug from the receptacle.

In accord with another preferred embodiment of the invention, a method of connecting a connector plug to a receptacle, comprising: engaging two or more pivotable inner coupling nut members with one or more threads on a receptacle to secure the connector plug to the receptacle in a closed position; and causing pivoting of the inner coupling nuts by pulling a lanyard so that the inner coupling nuts disengage the one or more threads in an open position to allow disengagement of the connector plug from the receptacle.

BRIEF DESCRIPTION OF THE DRAWINGS

Figure 1:
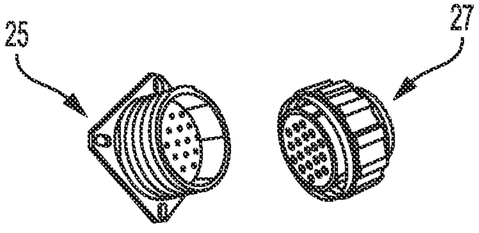
FIG. 1 PRIOR ART
Figure 2:
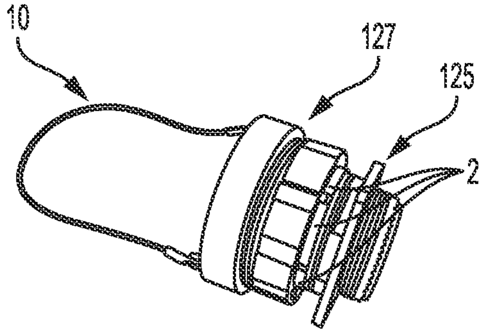
Figure 3:
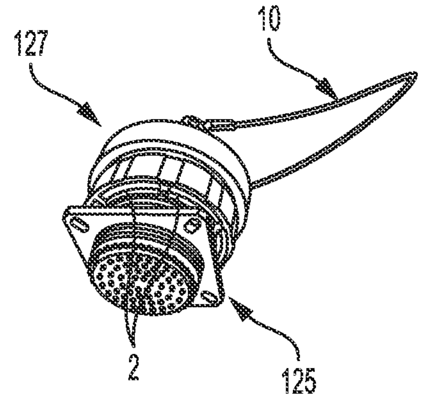
Figure 4:
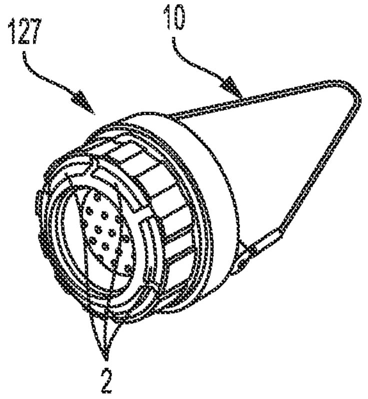
Figure 5:
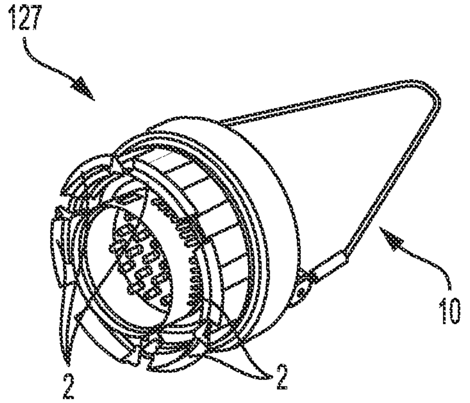
Figure 6:
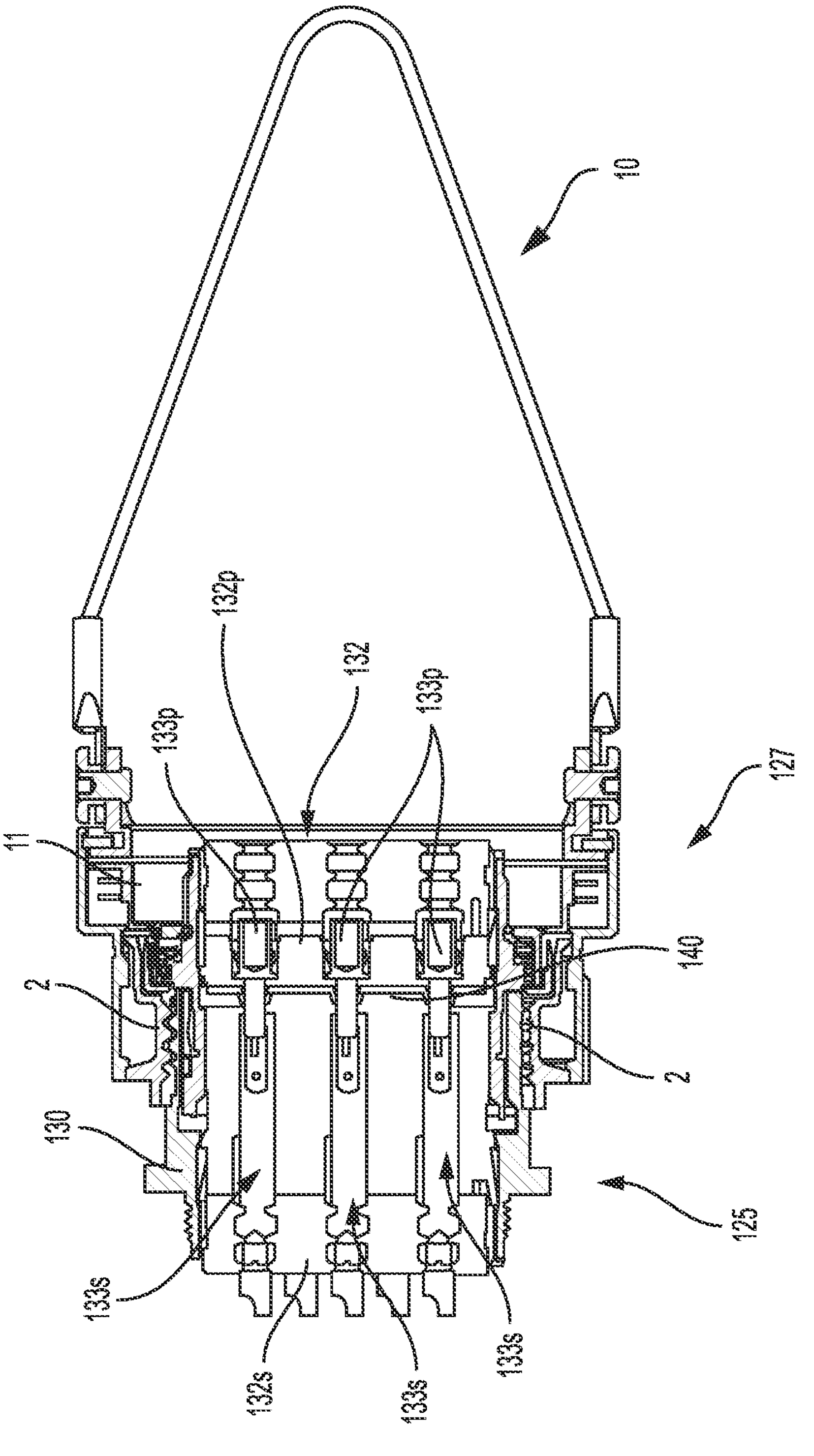
Figure 7:
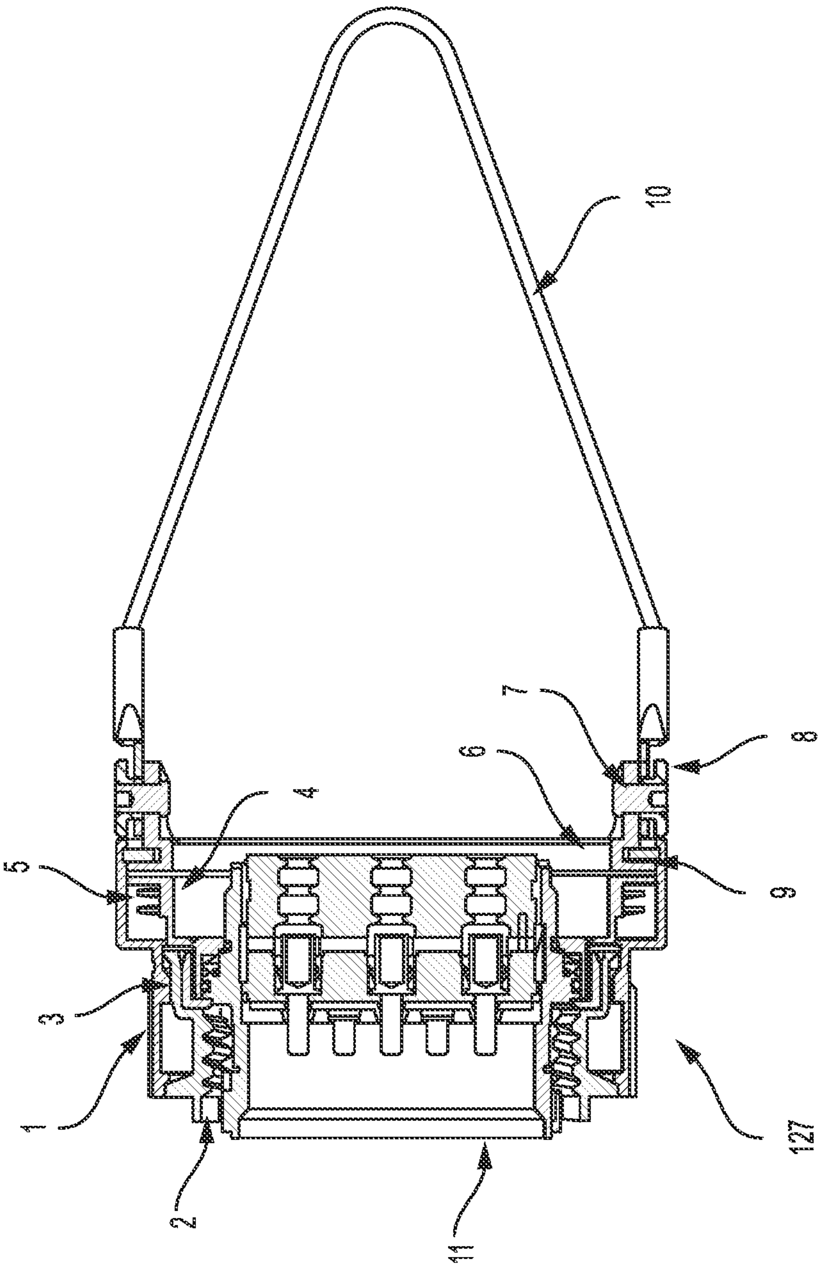
Figure 8:
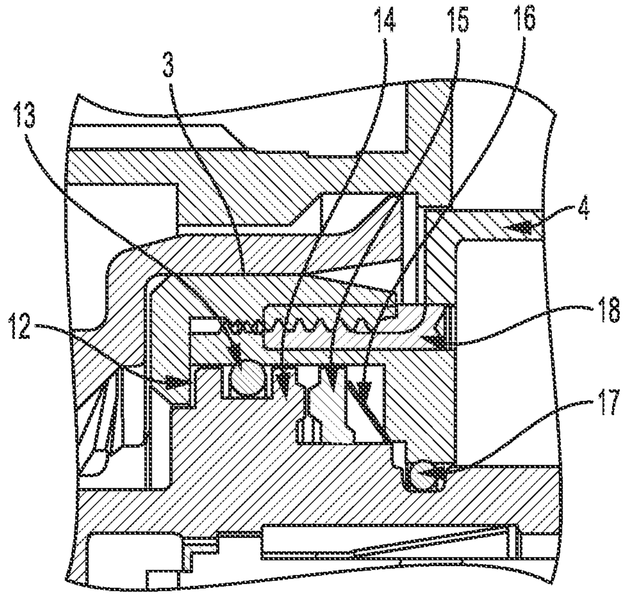
Figure 9:
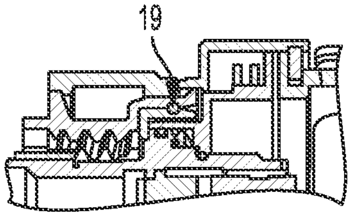
Figure 10:
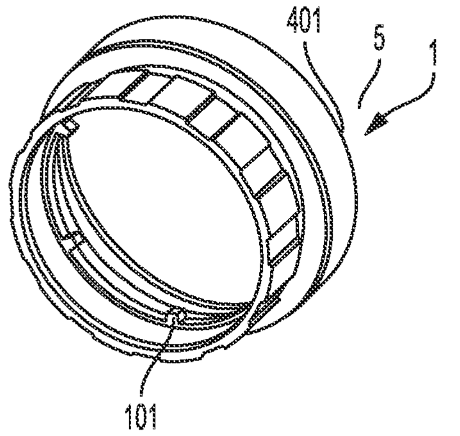
Figure 11:
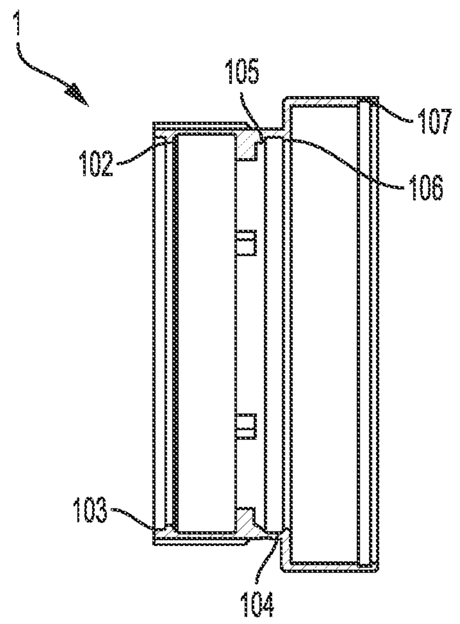
Figure 12:
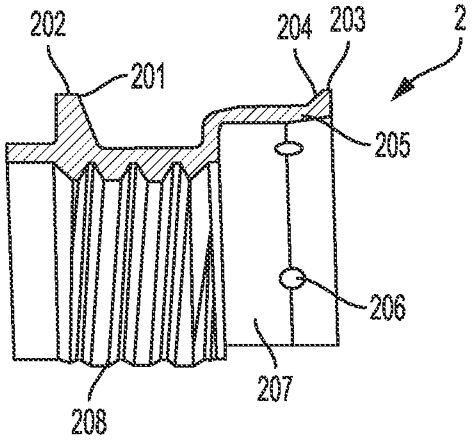
Figure 13:
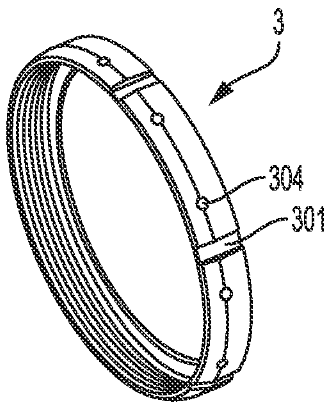
Figure 14:
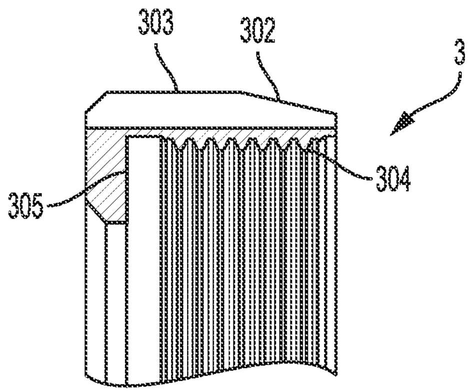
Figure 15:
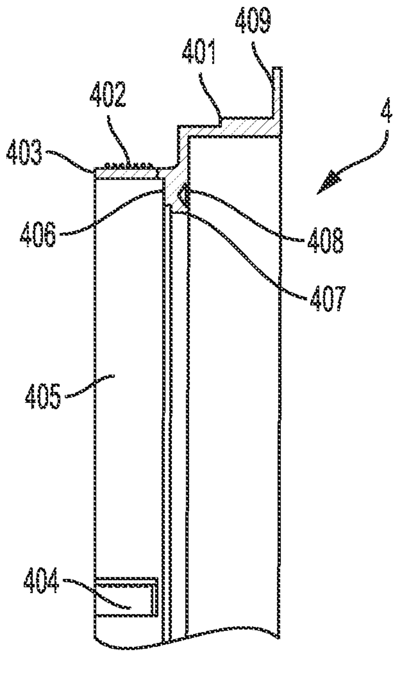
Figure 16:
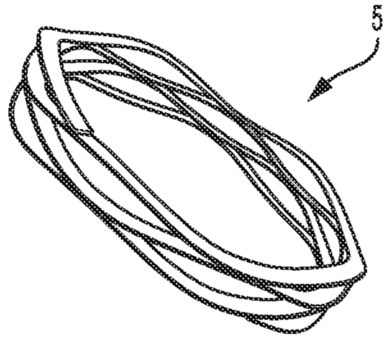
Figure 17:
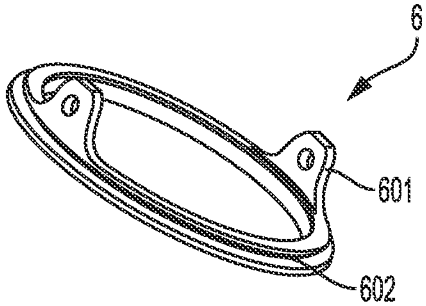
Figure 18:
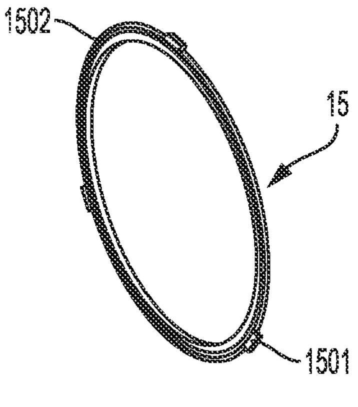
Figure 19:
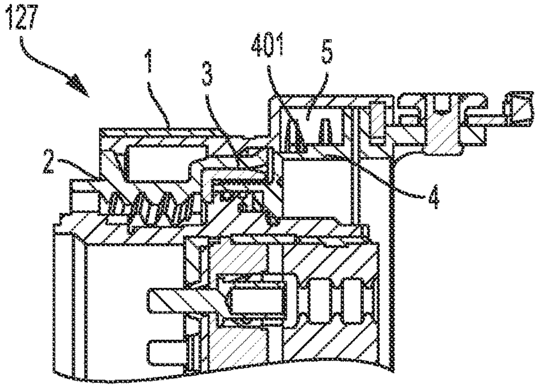
Figure 20:
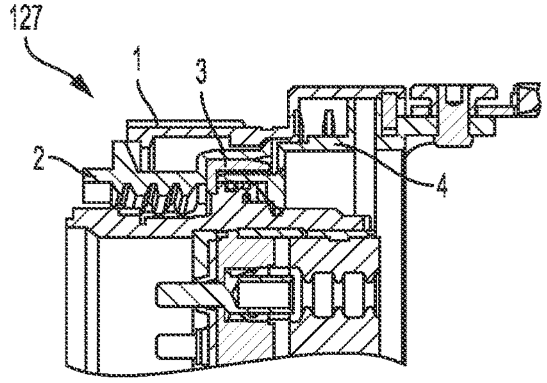
Figure 21:
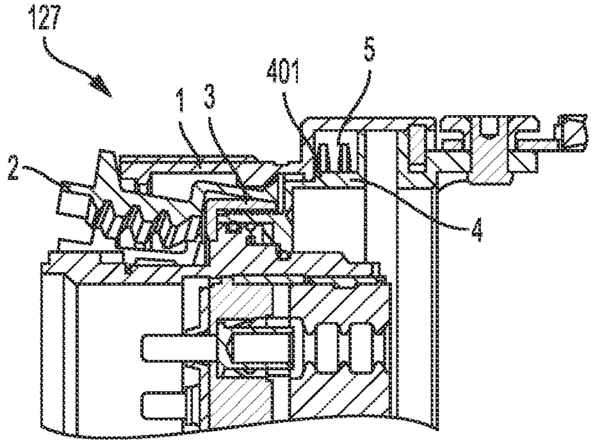
Figure 22:
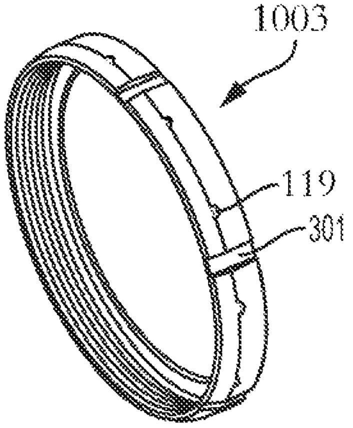
Figure 23:
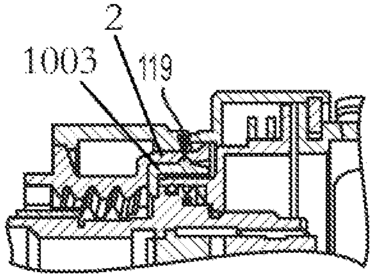

FIG. 1 is an illustration of a prior art MIL-DTL-38999 circular connector (receptacle and plug);

FIG. 2 is a right top perspective view of a circular connector comprising a receptacle and plug according to one embodiment of the invention;

FIG. 3 is front top perspective view of the circular connector comprising a receptacle and plug according the embodiment of FIG. 2;

FIG. 4 is right front perspective view of the circular connector with the receptacle removed from the plug but configured in the closed position according to the embodiment of FIG. 2;

FIG. 5 is a right front perspective view of the circular connector with the receptacle removed, with the lanyard pulled back in the open position in accord with the embodiment of FIG. 2;

FIG. 6 is a cross-sectional view of the connector including the receptacle and plug according to the embodiment FIGS. 2 and 3;

FIG. 7 is a cross-sectional view of the connector including the plug configured in the closed position, removed from the receptacle according to the embodiment of FIG. 4;

FIG. 8 is a partial cross-sectional view of the connector including the plug configured in the closed position, removed from the receptacle according to the configuration and embodiment of FIG. 7;

FIG. 9 is a partial cross-sectional view of the connector including the plug configured in the closed position, according to the configuration and embodiment of FIGS. 7 and 8;

FIG. 10 is front-right perspective view of the outer coupling according to the embodiments of FIGS. 2-9;

FIG. 11 is cross-sectional view of the outer coupling according to the embodiments of FIGS. 2-9;

FIG. 12 is bottom perspective view of the inner coupling member according to the embodiments of FIGS. 2-9;

FIG. 13 is perspective view of the inner pivot ring according to the embodiments of FIGS. 2-9;

FIG. 14 is partial cross-sectional view of the inner pivot ring according to the embodiments of FIGS. 2-9;

FIG. 15 is partial cross-sectional view of the end cap according to the embodiments of FIGS. 2-9;

FIG. 16 is perspective view of the compression spring according to the embodiments of FIGS. 2-9;

FIG. 17 is perspective view of the rotating end ring according to the embodiments of FIGS. 2-9;

FIG. 18 is perspective view of the rear ratchet according to the embodiments of FIGS. 2-9;

FIG. 19 is partial cross-sectional view of the connector plug at a resting state (compression spring is providing force) according to the embodiment of FIGS. 2-9;

FIG. 20 is partial cross-sectional view of the connector plug with the lanyard pulled back, outer coupling ring pulled back, an inner coupling ring sections shown starting to expand according to the embodiment of FIG. 2-9;

FIG. 21 is partial cross-sectional view of the connector plug with the inner coupling ring sections mechanically forced out, wherein the outer coupling ring hits the hard stop on the end cap;

FIG. 22 is perspective view of the inner pivot ring according to an alternative embodiment that uses pivot protrusions instead of bearings; and FIG. 23 is a partial cross-sectional view of the connector including the plug configured in the closed position, according to the embodiment of FIG. 22.

DETAILED DESCRIPTION OF THE PREFERRED EMBODIMENTS

For the purpose of illustrating the invention, there is shown in the accompanying drawings several embodiments of the invention. However, it should be understood by those of ordinary skill in the art that the invention is not limited to the precise arrangements and instrumentalities shown therein and described below.

The connector in accordance with preferred embodiments of the present invention is illustrated in FIGS. 2-21, wherein like reference numerals are used throughout to designate like elements.

The following is a catalog of the major parts of the connector:

1. outer coupling ring
2. inner coupling nut member
3. inner pivot ring
4. end cap
5. compression spring
6. rotating end ring
7. swage pin
8. swage bushing
9. retaining ring
10. lanyard
11. shell
12. thrust washer
13. front o-ring
14. front ratchet (part of shell)
15. rear ratchet
16. belleville springs (3×)
17. rear O-ring
18. dowel pin (2×180 deg apart) (installed by drilling through end cap threads and inner pivot ring threads then press fitting through hole)
19. ball bearings
125. receptacle
127. plug With reference to FIGS. 2 and 3, FIG. 2 is a right top perspective view of a circular connector comprising a receptacle and plug according to one embodiment of the invention and FIG. 3 is front top perspective view of the circular connector comprising a receptacle and plug according the embodiment of FIG. 2. Shown in FIG. 2 and FIG. 3, a plug 127 of the connector is screwed onto a receptacle 125. The plug 127 comprises a series of threaded inner coupling nut members 2 that has threads that match threads on the receptacle 125 so that the plug 127 may be screwed onto the receptacle 125. In basic operation, as explained in more detail herein, when the lanyard 10 of the plug 127 is pulled, or restrained when the plug 127 is restrained as the receptacle is pulled away (by a launch or the dropping of the attached ordinance, then the lanyard 10 causes the mechanism of the connector to pull the threads of the inner coupling nut members 2 off of the threads of the receptacle 125, to thereby release the plug 127 from the receptacle 125. In one embodiment, instead of having a lanyard 10, other options for decoupling or disengagement from the receptacle 125 include, by way of example, and not by limitation, hand pulling of the mechanism, pull-tab, or other means that would be known to those of skill in the art.

With reference to FIGS. 4 and 5, FIG. 4 is right front perspective view of the circular connector with the receptacle removed from the plug but configured in the closed position according to the embodiment of FIG. 2, and FIG. 5 is a right front perspective view of the circular connector with the receptacle removed, with the lanyard pulled back in the open position in accord with the embodiment of FIG. 2. In FIG. 4, inner coupling nuts members 2 are shown in the closed position, with the threaded portions closed in as configured to receive the threads of the receptacle (125 in FIGS. 2 and 3), when the lanyard 10 has not yet been pulled back. In FIG. 5, the inner coupling nut members 2 are shown in the open position, with the threaded portions spread out as when the lanyard 10 has been pulled for release from the receptacle.

With reference to FIG. 6, a cross-sectional view of the connector including the receptacle and plug according to the embodiment FIGS. 2 and 3 is shown. Illustrated is a contact assembly 132, designated pin assembly 132*p* and a socket assembly 132*s*. The contact assemblies 132 are interchangeably supported by the shell bodies 11 and 130, and have a suitable conventional configuration wherein one or more pins 133*p* of the pin assembly 132*p* engage a corresponding number of sockets 133*s* of the socket assembly 132*s*.

With reference to FIG. 7, a cross-sectional view of the connector is shown including the plug configured in the closed position, removed from the receptacle according to the embodiment of FIG. 4. The assembly of the plug 127 portion of the connector includes an outer coupling ring 1, an inner coupling nut 2, an inner pivot ring 3, an end cap 4, compression spring 5, rotating end ring 6, swage pin 7, swage bushing 8, retaining ring 9, and alanyard 10.

With reference to FIG. 8, a partial cross-sectional view of the connector is shown including the plug configured in the closed position, removed from the receptacle according to the configuration and embodiment of FIG. 7. The plug 127 shell 11, thrust washer 12, front o-ring 13, front ratchet (part of shell) 14, rear ratchet 15, belleville springs 16, rear O-ring 17, and dowel pin 18.

With reference to FIG. 9, a partial cross-sectional view of the connector including the plug configured in the closed position is shown, according to the configuration and embodiment of FIGS. 7 and 8. The ball bearings 19 are illustrated in FIG. 9.

The detailed interactions between these parts will now be described.

With reference to FIG. 10, a front-right perspective view of the outer coupling ring according to the embodiments of FIGS. 2-9 is shown. The inner part of the outer coupling ring 1 comprises keys 101 that keep the inner pivot ring 3 in rotational alignment. The outer coupling ring slides back and forth on the inner pivot ring 3 during release. The keys 101 slide through keyways 301 that are matched space-wise around the inner pivot ring 3 with the kays 101.

FIG. 11 is cross-sectional view of the outer coupling ring according to the embodiments of FIGS. 2-9. In one embodiment, the outer coupling ring 1 has a first angled surface 102 positioned in front of the keys that matches with, and keeps in rotational alignment with a first angled notch 201 on each of the inner coupling nut members 2. In one embodiment, the angle of the first surface 102 is between nineteen degrees and 21 degrees, or between 0-90 degrees by way of example and not by way of limitation. In one embodiment, the angle can be between zero to ninety degrees. The first angled surface 102 keeps the first notch 201 pushed forward and closed down in the connector plug 127 is in the resting or closed state. The diameter of a front ridge 103 of the outer coupling ring 1 and of the first surface 202 ensures that the inner coupling nut 2 cannot start to disengage until the surface 202 of the first notch 201 clears the movement of outer coupling ring 1.

A s surface 104 located behind the keys 101 matches a second notch 203 located on a back portion of each of the inner coupling nut member 2. The contact of the second surface 104 ensures proper alignment of the inner coupling nut 2 at a resting or closed state of the pug 127.

An inner angled second surface 105 is positioned to hit an angled surface 204 the second notch 203 of the inner coupling nut member 2 during disengagement of the plug 127. The inner angled second surface 105 is positioned between the keys 101 and the second surface, and may have, by way of example, and not by way of limitation, an angle of 40 degrees to 50 degrees to ensure release. In embodiment, the release could potentially be achieved by any interfering surfaces and is not limited to the angle of the surfaces.

A hard stop 106 is positioned behind the second surface 104 to prevent excessive pull from the lanyard 10 by matching a hard stop on the end cap 4. A groove 1*g* is positioned to retain the retaining ring 9.

With reference to FIG. 12, a bottom perspective view of the inner nut coupling member 2 according to the embodiments of FIGS. 2-9 is shown. The first angled notch 201 matches against the first surface 102 of the outer coupling ring 1 (102 and 1 in FIG. 11) to force the inner coupling nut members 2 into proper alignment at the resting or closed state of the plug 127. The angled surface 202 of the inner coupling nut 2 matches with the front ridge 103 of the outer coupling ring 1 in order to ensure movement of the inner coupling nut 2 upon the pulling back of the outer coupling ring 1, to cause the inner coupling nut members 2 to expand away from the threading of the receptacle 125 when the lanyard 10 is pulled.

The second angled notch 203 is configured to match the second angled surface 104 of the outer coupling ring 1 to ensure that the inner coupling nut 2 stays parallel to the main axis at the resting or closed state of the plug 127. The angled surface 204 of the second notch 203 is configured to contact the inner angled third surface 105 during pulling of the lanyard 10 and release of the plug 127 to mechanically force disengagement of the inner coupling nuts 2 from the threads of the receptacle 125.

An angled bottom portion 205 of the inner coupling nut 2 provides for clearance from an front top angled portion 302 of the inner pivot ring 3 during disengagement to allow the inner coupling nut 2 to pivot fully. One or more bearing detents 205 each captures and holds a ball bearing on which the inner coupling nut 2 pivots.

A bottom surface 207 in front of the bearing detents 206 matches with the upper surface 303 of the inner pivot ring 3 to ensure proper alignment of the inner coupling nut 2 during the resting or closed state of the plug 127.

As explained above, the threads 208 mate with the threads on the shell body 130 of the receptacle 125.

FIG. 13 is a perspective view of the inner pivot ring 3 according to the embodiments of FIGS. 2-9 and FIG. 14 is partial cross-sectional view of the inner pivot ring 3 according to the embodiments of FIGS. 2-9. As discussed above, the keyways 301 provided rotational support for the keys 101 and allow the keys 101 to slide during disengagement. As explained above, an angled bottom portion 205 of the inner coupling nut 2 provides for clearance from the front top angled portion 302 of the inner pivot ring 3 during disengagement to allow the inner coupling nut 2 to pivot fully. As stated above, a bottom surface 207 of the inner coupling nut member 2 matches with the upper surface 303 of the inner pivot ring 3 to ensure proper alignment of the inner coupling nut member 2 during the resting or closed state of the plug 127. This makes for proper alignment and keeps the ball bearings 19 retained between detents or cavities on the inner pivot ring 3 and the cavities on the cavities 206 on the inner coupling nut members 2.

The threads 305 on the inner pivot ring 3 are for assembly of the plug and mate with the threads 402 on the end cap 4, which are locked with the dowel pin 18 after assembly to prevent rotation with respect to one another. A back ridge 306 provides a surface to bottom out with the front 403 of the end cap 4.

FIG. 15 is partial cross-sectional view of the end cap 4 according to the embodiments of FIGS. 2-9. A hard stop 4*a* for the pull mechanism interferes or interacts with the hard stop 106 of the outer coupling ring 1. As explained above, the threads 4*b* are for securing the end cap 4 to the inner pivot ring 3 threads 305. The front 403 of the end cap 4 sets the height for the belleville springs 16 by bottoming out on the back ridge 306 of the inner pivot ring 3 to thereby set the torque.

Keyways in the end cap 4 are configured to work with squared nubs 1501 on the rear ratchet 15 to prevent rotation. A sealing surfaces 405 for the o-rings 17 are provided. A back ridge 406 retains the belleville springs 16 and sets the torque value.

Two wrench holes 408 may be 180 degrees apart for use in assembly, and a rear surface 409 retains the compression spring 5. In the resting state, the compression spring 5 is compressed and provides force against the mechanism.

FIG. 16 is perspective view of the compression spring 5 according to the embodiments of FIGS. 2-10.

FIG. 17 is perspective view of the rotating end ring 6 according to the embodiments of FIGS. 2-9. Ears 601 fit a swage pin 7 and retain the lanyard 10.

FIG. 18 is perspective view of the rear ratchet 15 according to the embodiments of FIGS. 2-9. Keyways in the end cap 4 are configured to work with squared nubs 1501 of the end ring 15 to prevent rotation.

FIG. 19 is partial cross-sectional view of the connector pug 127 at resting state (wherein the compression spring 5 is providing force) according to the embodiment of FIGS. 2-9;

FIG. 20 is partial cross-sectional view of the connector plug 127 with the lanyard 10 pulled back, outer coupling ring 1 pulled back, and inner coupling ring 3 sections shown starting to expand according to the embodiment of FIG. 2-9; and FIG. 21 is partial cross-sectional view of the connector plug 127 with the inner coupling ring 3 sections mechanically forced out, wherein the outer coupling ring 1 hits the hard stop 4*a* on the end cap 4.

In one embodiment, the connector plug 127 may be configured to cause pivoting of the nut members 2 when the lanyard is pulled at an angle offset between 0 degrees to 60 degrees from the centreline of the mated pair.

In one embodiment, the outer coupling ring 1 that is configured to engage one or more surfaces on the nut members 2 that causes each nut member 2 to pivot over the ball bearing 19 placed between the nut member 2 and an inner coupling ring 3.

In one embodiment, the compression spring 3 may be configured to bias the connector plug 127 such that the nut members 2 are biased in a closed position until sufficient force is applied to the lanyard 10 to cause the nut members 2 into the open position.

In one embodiment, the compression spring 3 is replaceable in order to adjust the compression and therefore the force necessary to cause the nut members 2 into the open position.

In yet another embodiment, the connector plug 127 is a self-locking connector plug as described in U.S. Pat. No. 8,002,566, entitled "Self-Locking Electrical Connector", issued Aug. 11, 2011, the contents of which are hereby incorporated by reference in its entirety that includes a ratcheting system.

In yet another embodiment, the connector plug 127 may further comprise one or more optical male connectors that are configured to fit into one or more optical female sockets in the receptacle 125.

Further, the term lanyard is not to be interpreted in the traditional sense, but may comprise one or more rings, tabs, protrusions, or anything that is capable being pulled to activate the release mechanism described herein. In one embodiment, no pulling implement is needed, and instead, only the a pivot mechanism is provided that is configured to cause pivoting of the nut members to disengage the one or more threads in an open position to allow disengagement of the connector plug from the receptacle.

With reference to FIG. 22, a perspective view of the inner pivot ring 1003 is shown according to an alternative embodiment that uses pivot protrusions instead of bearings. As discussed above, the keyways 301 provide rotational support for the keys 101 and allow the keys 101 to slide during disengagement. As explained above, an angled bottom portion 205 of the inner coupling nut 2 provides for clearance from the front top angled portion 302 of the inner pivot ring 3 during disengagement to allow the inner coupling nut 2 to pivot fully. As stated above, a bottom surface 207 of the inner coupling nut member 2 matches with the upper surface 303 of the inner pivot ring 3 to ensure proper alignment of the inner coupling nut member 2 during the resting or closed state of the plug 127. However, instead of using ball bearings retained between detents or cavities on the inner pivot ring and the cavities 206 on the inner coupling nut members 2, protrusions 119 are used in the place of bearings in this embodiment upon which the cavities 206 on the inner coupling nut members 2 pivot. In one embodiment, the protrusion 119 comprises a rounded bulbous shaped protrusion.

With reference to FIG. 23, a partial cross-sectional view of the connector including the plug configured in the closed position is shown, according to the embodiment of FIG. 23. One of the protrusions 119 on the inner pivot ring 1003 is shown in the cross-sectional view on which the inner coupling nut member 2 pivots.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A connector plug, comprising:

one or more pivotable nut members that are configured to engage one or more threads on a receptacle to secure the connector plug to the receptacle in a closed position;

a pull release configured to cause pivoting of the nut members to disengage the one or more threads in an open position to allow disengagement of the connector plug from the receptacle; and;

an outer coupling ring that is configured to engage one or more surfaces on the nut members that causes each nut member to pivot over a protrusion on an inner pivot ring.

2. The connector plug of claim 1, wherein the connector plug is configured to cause pivoting of the nut members when the pull release is pulled at an angle offset between 0 degrees to 60 degrees from a centerline of the connector plug and the receptacle when they are engaged.

3. The connecter plug of claim 1, wherein the protrusion comprises a rounded bulbous shaped protrusion.

4. The connector plug of claim 1, further comprising a compression spring configured to bias the connector plug such that the nut members are biased in a closed position until sufficient force is applied to the pull release to cause the nut members into the open position.

5. The connector plug of claim 4, wherein the compression spring is replaceable in order to adjust the compression and therefore the force necessary to cause the nut members into the open position.

6. The connector plug of claim 1, wherein the connector plug is a self-locking connector plug with a ratcheting system.

7. The connector plug of claim 1, comprising a series of nut members that each have threads that match the threads on the receptacle so that the plug is configured to be screwed onto the receptacle.

8. The connector plug of claim 7, wherein the connector plug is configured such that when the pull release is pulled, then the pull release causes the nut members to pull the threads of the nut members off of the threads of the receptacle, to thereby release the connector plug from the receptacle.

9. The connector plug of claim 1, wherein the connector plug further comprises one or more electrical pins that are configured to fit into one or more electrical sockets in the receptacle.

10. The connector plug of claim 9, wherein the connector plug further comprises one or more optical male connectors that are configured to fit into one or more optical female sockets in the receptacle.

11. A method of connecting a connector plug to a receptacle, comprising:

engaging one or more pivotable nut members with one or more threads on a receptacle to secure the connector plug to the receptacle in a closed position;

causing pivoting of the nut members by pulling a pull release so that the nut members disengage the one or more threads in an open position to allow disengagement of the connector plug from the receptacle; and engaging an outer coupling ring with one or more surfaces on the nut members that causes each nut member to pivot over a protrusion on an inner coupling ring.

12. The method of claim 11, wherein the connector plug is configured to cause pivoting of the nut members when the pull release is pulled at an angle offset between 0 degrees to 60 degrees from an angle of connection with the receptacle.

13. The method of claim 11, wherein the protrusion comprises a rounded bulbous shaped protrusion.

14. The method of claim 11, further comprising a compression spring configured to bias the connector plug such that the nut members are biased in a closed position until sufficient force is applied to the pull release to cause the nut members into the open position.

15. The method of claim 14, wherein the compression spring is replaceable in order to adjust the compression and therefore the force necessary to cause the nut members into the open position.

16. The method of claim 11, wherein the connector plug is a self-locking connector plug with a ratcheting system.

17. The method of claim 11, wherein the connector plug comprises a series of threaded nut members that each have threads that match the threads on the receptacle so that the plug is configured to be screwed onto the receptacle.

18. The method of claim 17, wherein the connector plug is configured such that when the pull release is pulled, then the pull release causes the nut members to pull the threads of the nut members off of the threads of the receptacle, to thereby release the connector plug from the receptacle.

19. The method of claim 11, wherein the connector plug further comprises one or more electrical pins that are configured to fit into one or more electrical sockets in the receptacle.

20. The method of claim 11, wherein the connector plug further comprises one or more optical male connectors that are configured to fit into one or more optical female sockets in the receptacle.

21. A connector plug, comprising:

one or more pivotable nut members that are configured to engage one or more threads on a receptacle to secure the connector plug to the receptacle in a closed position;

a pull mechanism that is configured to cause pivoting of the nut members to disengage the one or more threads in an open position to allow disengagement of the connector plug from the receptacle; and;

an outer coupling ring that is configured to engage one or more surfaces on the nut members that causes each nut member to pivot over a protrusion on an inner coupling ring.

* * * * *